US008325386B2

(12) United States Patent
Koike

(10) Patent No.: US 8,325,386 B2
(45) Date of Patent: Dec. 4, 2012

(54) PRINTING USING DISPLAY LIST FROM VECTOR DATA OR DISPLAY LIST OBTAINED FROM LOCATION INFORMATION

(75) Inventor: Hisashi Koike, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 12/464,065

(22) Filed: May 11, 2009

(65) Prior Publication Data

US 2009/0290178 A1 Nov. 26, 2009

(30) Foreign Application Priority Data

May 20, 2008 (JP) ................................ 2008-132323

(51) Int. Cl.
*G06K 1/00* (2006.01)
*G09G 5/00* (2006.01)
*G06K 15/02* (2006.01)

(52) U.S. Cl. ........ 358/1.9; 358/1.2; 358/1.11; 358/1.13; 358/1.15; 358/1.16; 358/3.03; 358/3.28; 358/442; 358/448; 358/453; 382/100; 382/112; 382/128; 382/159; 382/164; 382/167; 382/178; 382/190; 382/198; 382/199; 382/224; 382/229; 382/254; 382/282; 382/298; 382/305; 382/307; 399/16; 399/67; 399/48; 399/328; 399/330; 399/333; 345/636; 345/638; 345/698; 707/999.005; 707/999.101; 707/999.104; 707/999.107; 707/107; 707/695; 707/705; 707/748; 707/769; 707/779; 707/793; 707/825

(58) Field of Classification Search ........................ None
See application file for complete search history.

(56) References Cited

U.S. PATENT DOCUMENTS

| | | | | |
|---|---|---|---|---|
| 6,466,229 | B1 * | 10/2002 | Nagao | 345/621 |
| 2002/0186383 | A1 * | 12/2002 | Obrador | 358/1.2 |
| 2006/0007481 | A1 | 1/2006 | Kato et al. | |
| 2007/0201052 | A1 * | 8/2007 | Caine | 358/1.2 |

FOREIGN PATENT DOCUMENTS

| | | |
|---|---|---|
| JP | 2003-256216 | 9/2003 |
| JP | 2006-146486 | 6/2006 |
| JP | 2010117909 A | 5/2010 |

* cited by examiner

*Primary Examiner* — Steven Kau

(74) *Attorney, Agent, or Firm* — Fitzpatrick, Cella, Harper & Scinto

(57) ABSTRACT

The transfer of a duplicate electronic document between image forming devices is done with an electronic document that is formed of only resolution-independent vector data and the like, and a normal printing of the duplicate electronic document or printing of different resolution is performed by developing the vector data. In high-quality printing of the duplicate electronic document, a Fill Map included in the original document the information indicating the location of an electronic document of copy source that is embedded in a metadata specifies is obtained, and this printing is made using the Fill Map.

7 Claims, 11 Drawing Sheets

PRINTING USING DISPLAY LIST FROM VECTOR DATA OR DISPLAY LIST OBTAINED FROM LOCATION INFORMATION

BACKGROUND OF THE INVENTION

1. Field of the Invention

The present invention relates to an image forming device such as a complex machine that can store an electronic document in the machine.

2. Description of the Related Art

Recently, in complex machines referred to as a multi function printer (MFP), there is the one that can not only perform copy or PDL print, but also can store a document having been read from a scanner or a document having been transmitted in a PDL format from a host computer in an internal part of the MFP as an electronic document.

Furthermore, there has been the document of which a storage form is a small data amount that is not dependent on a resolution by converting an electronic document not to an image in units of pages, but to a vector format of elements in units of e.g., paths with respect to each graphic by analyzing the content (refer to Japanese Patent Laid-Open No. 2006-146486).

Further, in environments in which a plurality of MFPs is used, a electronic document is not only stored in the device with which this document has been created, but also can be stored in the other device via a network in order to be able to use the copy of the document from any device via a server. In a case where an electronic document that is often used is duplicated at a plurality of MFPs, even when a certain MFP is occupied by someone or in the state in which it is under maintenance and cannot be directly used, this electronic document can be printed using the other MFP.

In addition, known is such a technique that on the occasion of copying a paper document, an original electronic document having been used on creating this paper document (i.e. on copying) is searched for on a network, the original electronic document having been found is obtained, and printing of higher quality than that of copy from the paper is performed (refer to Japanese Patent Laid-Open No. 2003-256216).

On the other hand, there are tendencies to be insufficient infrastructure with respect to the demand of dependent on a network, and to be a larger load that is applied to the network. Since an electronic document of high resolution such as 1200 dpi is considerably large in size even if it is compressed, transmission of this compressed electronic document to the other MFP takes rather long time.

Further, when the network is in disorder or disconnection, it is problematic. In particular, in the case of being dependent on a server, such an event takes place that a stored electronic document cannot be known to be present or absent, and thus nothing can be done.

SUMMARY OF THE INVENTION

An object of the present invention, in a system including a plurality of image forming devices that can store an electronic document, is to provide functions of transmitting a duplicate document to the other device and printing it without applying an unnecessary high load to communication. Furthermore, the present invention can provide an image forming device that can suppress a communication load when generation of a high-quality image is unnecessary, as well as that can perform high-quality image generation.

An image forming device according to the present invention comprises: a unit for receiving a duplicate electronic document including vector data and metadata generated in other image forming device; a unit for, in the case of a first printing, generating a resolution-dependent display list from the vector data of the duplicated electronic document; a unit for, in the case of a second printing which is higher quality than that of the first printing, obtaining a resolution-dependent display list having been used in creation of the vector data from information included in the metadata if a resolution of the resolution-dependent display list to be generated from the vector data and a resolution in the second printing are in the same range as a result of comparing the resolutions, wherein the information indicates the location of an electronic document which is a copy source of the duplicate electronic document; and a unit for printing by using the resolution-dependent display list to be generated from the vector data, or using the resolution-dependent display list obtained from the information indicates the location of the electronic document.

A method for forming an image performed in an image forming device according to the present invention, comprises: receiving a duplicate electronic document including vector data and metadata generated in other image forming device; in the case of a first printing, generating a resolution-dependent display list from the vector data of the duplicated electronic document; in the case of a second printing which is higher quality than that of the first printing, obtaining a resolution-dependent display list having been used in creation of the vector data from information included in the metadata if a resolution of the resolution-dependent display list to be generated from the vector data and a resolution in the second printing are in the same range as a result of comparing the resolutions, wherein the information indicates the location of an electronic document which is a copy source of the duplicate electronic document; and printing by using the resolution-dependent display list to be generated from the vector data, or using the resolution-dependent display list obtained from the information indicates the location of the electronic document.

According to the present invention, without application of an unnecessary high load to communication, a duplicate document can be transmitted to the other device, and can be printed. In addition, provided can be an image forming device that can suppress a communication load when generation of a high-quality image is not required, as well as that can also perform image generation of high quality.

Further features of the present invention will become apparent from the following description of exemplary embodiments (with reference to the attached drawings).

DESCRIPTION OF THE EMBODIMENTS

Embodiment 1

Hereinafter, a preferred embodiment according to a first invention will be described in detail referring to the attached drawings. However, it should be appreciated that components described in this embodiment are for demonstrative purposes, and the scope of this invention is not limited to these components.

<System Arrangement>

First, a system arrangement of this Embodiment 1 will be described with reference to FIG. 1.

Figure 1:
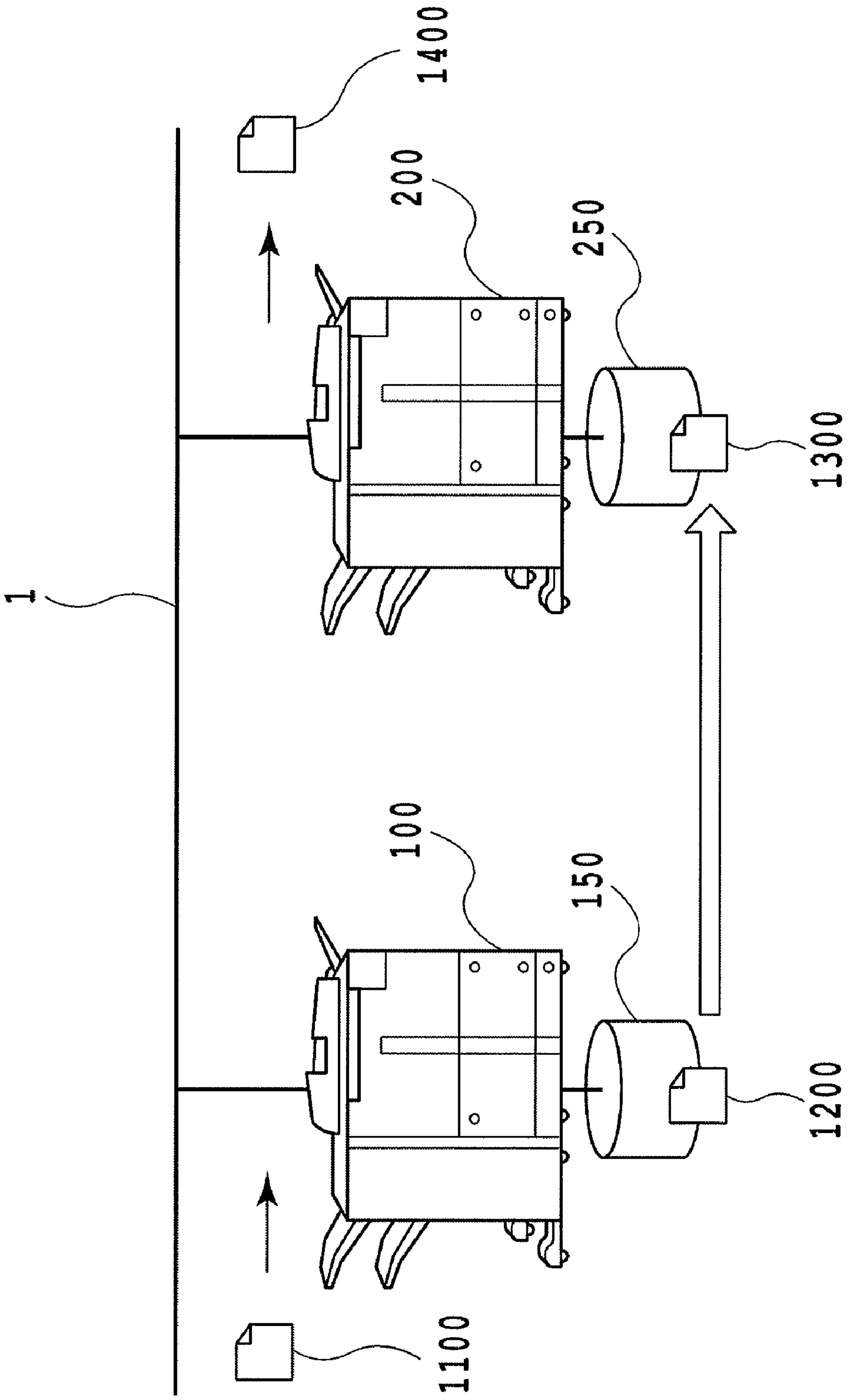
FIG. 1 is a schematic diagram illustrating a system arrangement of a first embodiment according to the present invention.

FIG. 1 is a schematic view illustrating the system arrangement of this Embodiment 1.

In FIG. 1, reference numeral 1 designates a network, and numerals 100 and 200 designate MFPs brought in connection through the network 1. Numeral 150 designates a storage for storing an electronic document in the MFP 100, and numeral 250 designates a storage in which an electronic document is stored in the MFP 200. Numeral 1100 designates a paper document to be read through a scanner provided at the MFP 100, numeral 1200 designates an electronic document stored in the storage 150, numeral 1300 designates an electronic document stored in the storage 250, and numeral 1400 designates a paper document printed using the MFP 200.

<Internal Configuration of Controller>

Now, with reference to FIG. 2, an internal configuration of a controller to be included in the MFP 100 will be described.

Figure 2:
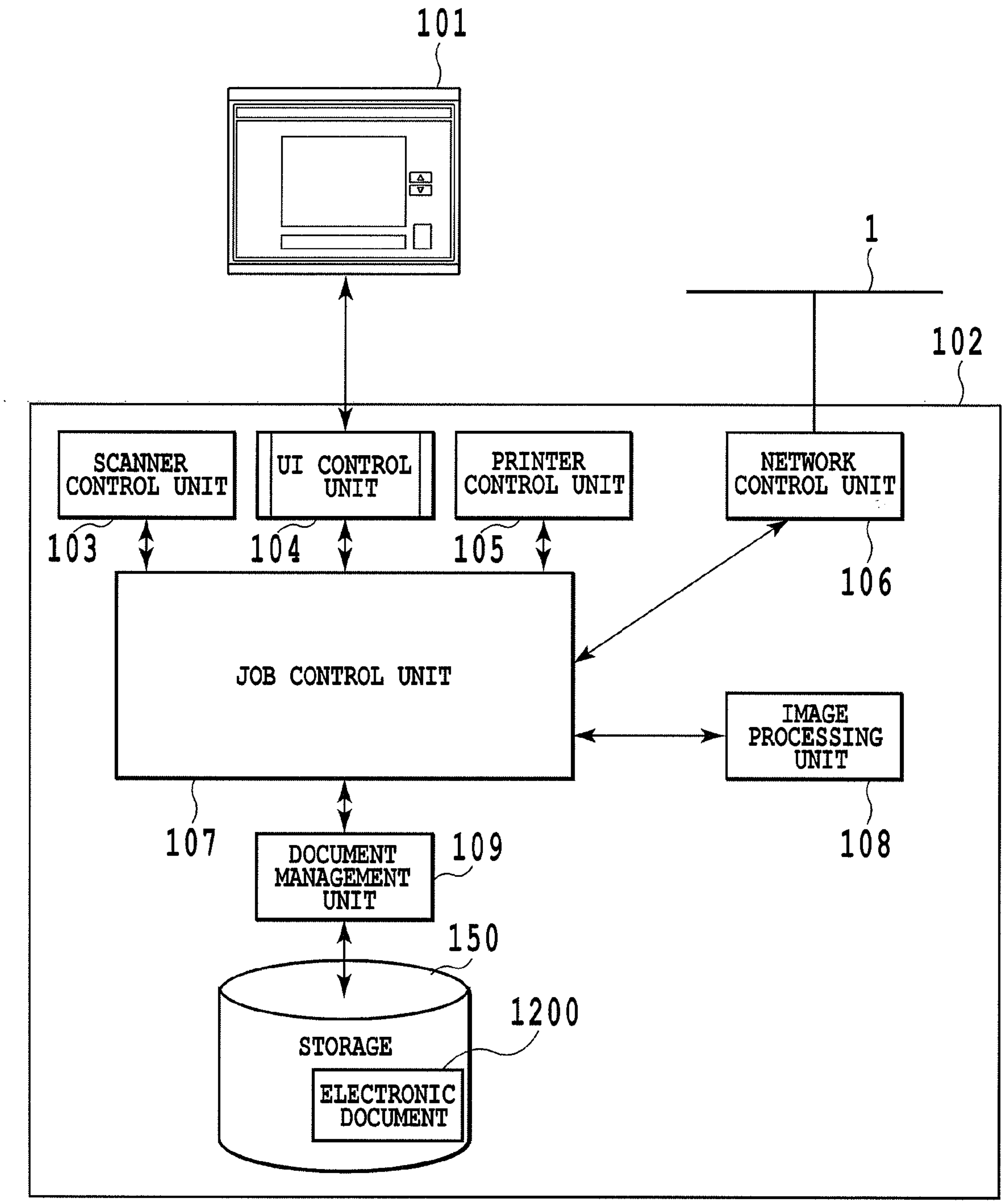
FIG. 2 is a schematic diagram illustrating an internal configuration of an MFP controller of the first embodiment according to the present invention.

FIG. 2 is a schematic view illustrating the internal configuration of the controller to be included in the MFP 100.

Incidentally, to simplify descriptions, the internal configuration of the controller of the MFP 200 is to be of the same configuration as well.

In FIG. 2, numeral 101 designates a user interface panel, and numeral 102 designates a controller. Numeral 103 designates a scanner control unit, which is connected to a scanner (not illustrated). Numeral 104 designates a UI control unit, which controls the input and output from the user interface panel 104. Numeral 105 designates a printer control unit, which is connected to a printer engine (not illustrated).

Numeral 106 designates a network control unit managing a connection control with a network, and this network control unit 106 is connected to the network 1. Numeral 107 designates a job control unit, which is connected to the scanner control unit 103, the UI control unit 104, the printer control unit 105, the network control unit and the like to control jobs. Numeral 108 designates an image processing unit, which executes image processing that is requested from the job control unit 107. Numeral 109 designates a module (document management unit) making a document management, and this document management unit 109 which makes a control of storing or reading data with respect to the storage 150.

<Structure of Electronic Document 1200>

Now, the structure of the electronic document 1200 will be described referring to FIG. 3.

Figure 3:
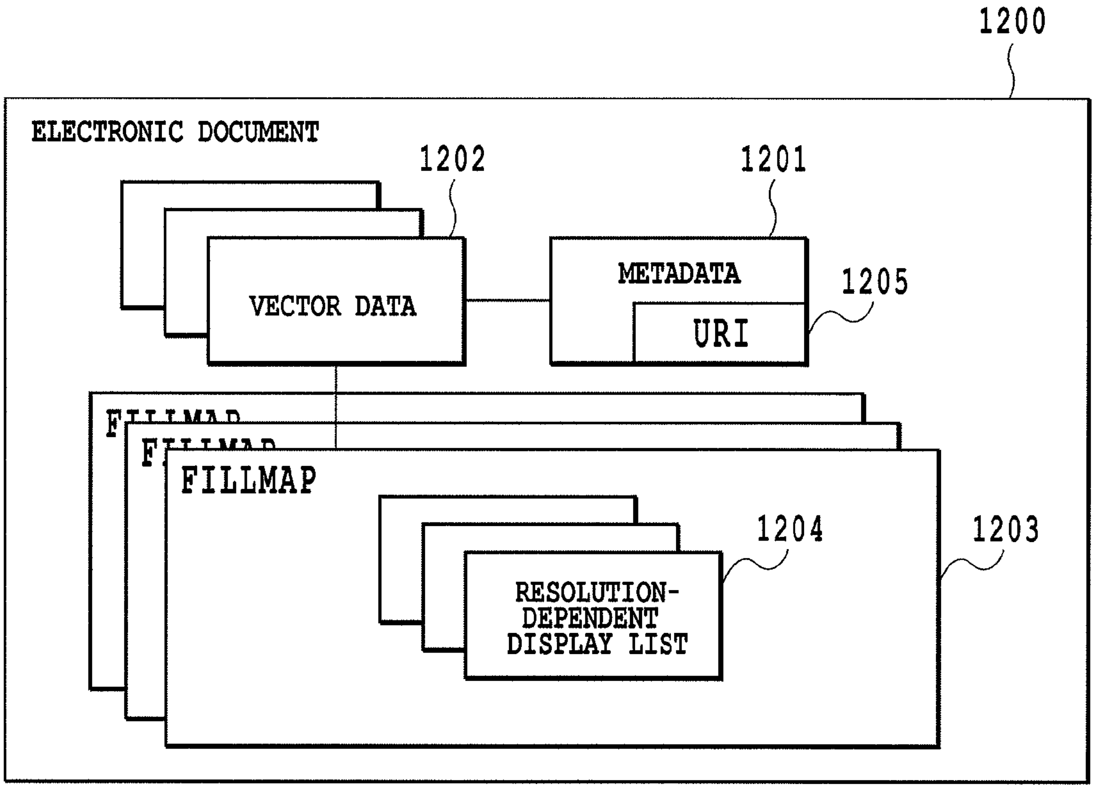
FIG. 3 is a schematic diagram illustrating a structure of a static electronic document in the first embodiment according to the present invention.

FIG. 3 is a diagram illustrating the structure of the static electronic document 1200 that is stored in the storage 150.

Numeral 1201 designates a metadata holding various attributes regarding this electronic document 1200. Numeral 1202 designates a resolution-independent vector data that is a vectored drawing data to be included in a page of this electronic document 1200, and numeral 1203 designates resolution-dependent data that is referred to as Fill Map in units of pages. Furthermore, numeral 1204 designates a resolution-dependent display list, being a list of a drawing object, and the Fill Map 1203 is formed of a set of resolution-dependent display lists 1204 in units of pages. Numeral 1205 designates URI (Uniform Resource Identifier) with which an electronic document can be specified via a network, and is included in the metadata 1201.

The electronic document 1200 is arranged as described above.

Incidentally, although a metadata is described to be one with respect to one document, it is possible to have one metadata on each page and to have a URI with which a page thereof can be specified. In case of this arrangement, even if separation or connection in units of pages is made, high-quality printing can be performed.

<Arrangement of Data to be Generated on the Occasion when Paper Document is Scanned>

Next, the arrangement of data to be generated on the occasion when a paper document is scanned will be described referring to FIG. 4.

Figure 4:
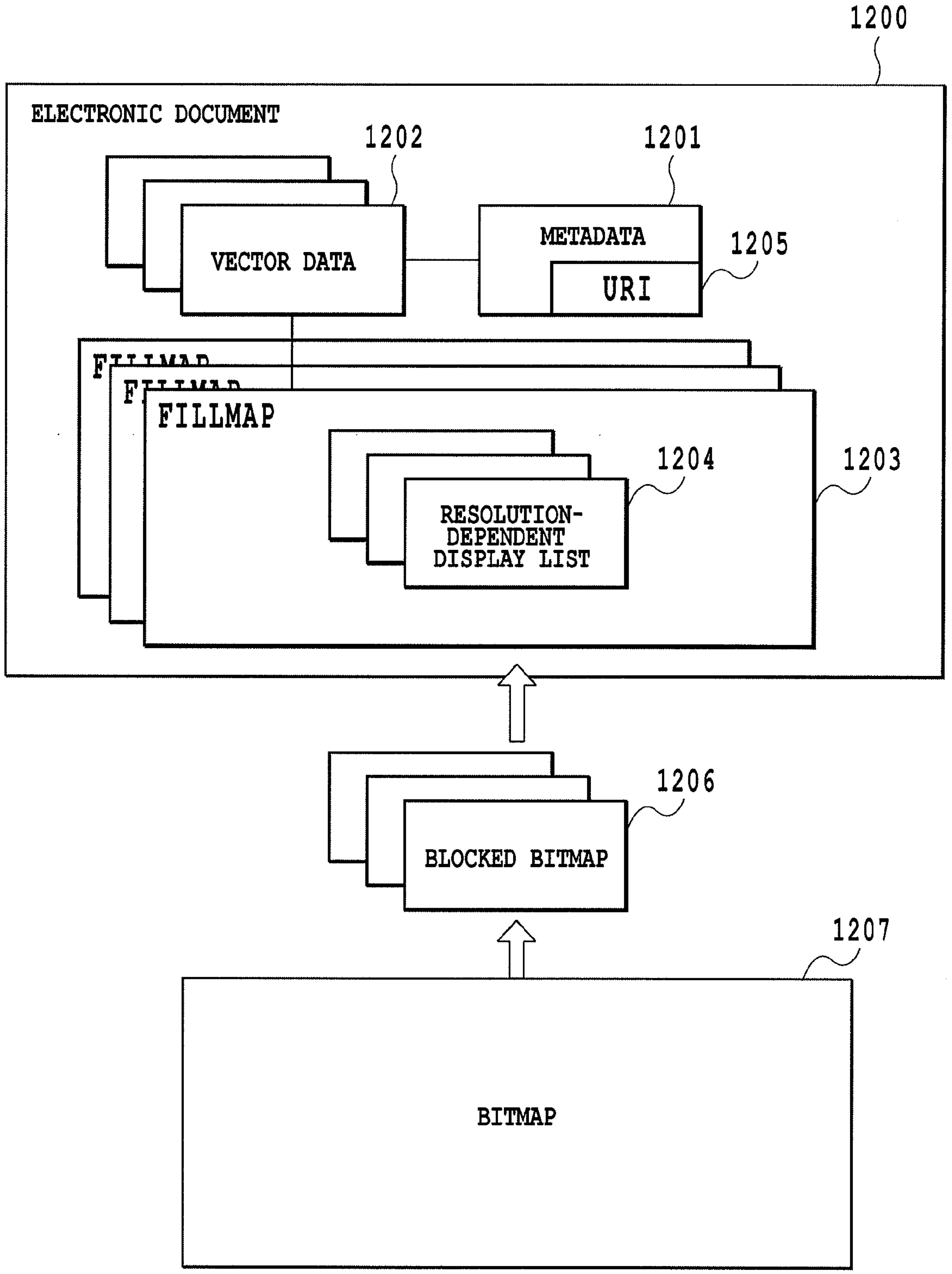
FIG. 4 is a schematic diagram illustrating a structure of data to be generated on the occasion of scanning in the first embodiment according to the present invention.

FIG. 4 is a diagram illustrating the arrangement of data to be generated on the occasion when a paper document is scanned.

Numeral 1207 designates a bitmap data to be obtained through a scanner, and numeral 1206 designates a blocked bitmap that is the decomposed bitmap 1207 in units of blocks.

As described above, in this embodiment, on the occasion when a paper document is scanned, a blocked bitmap is generated.

<Arrangement of Data to be Generated on the Occasion when an Electronic Document is Duplicated>

Next, the arrangement of data to be generated on the occasion when an electronic document is duplicated will be described referring to FIG. 5.

Figure 5:
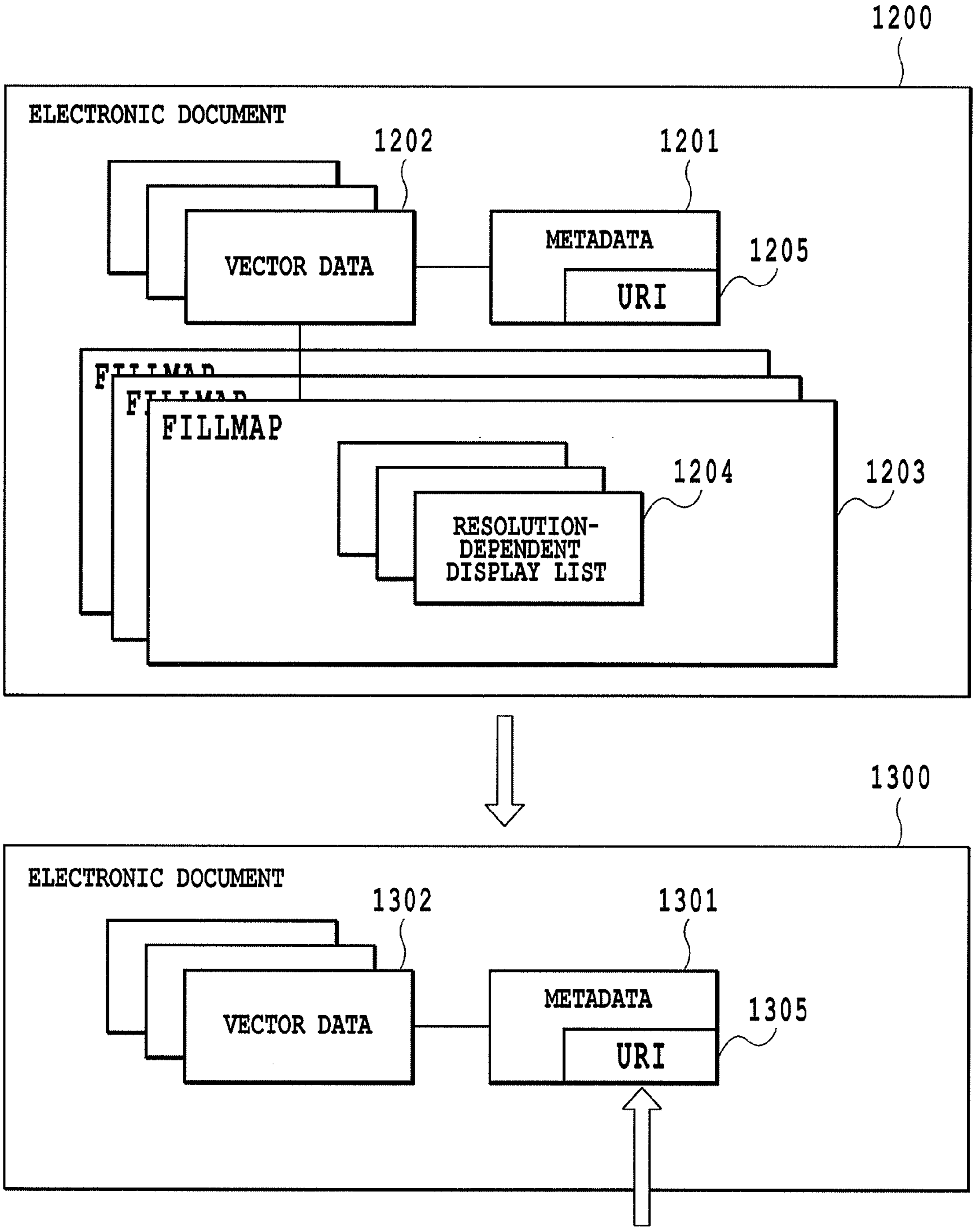
FIG. 5 is a schematic diagram illustrating a structure of data to be generated on the occasion of duplicating an electronic document in the first embodiment according to the present invention.

FIG. 5 is a diagram illustrating the arrangement of data to be generated on the occasion when an electronic document is duplicated.

Numeral 1300 designates an electronic document to be duplicated in the MFP 100 and to be transferred to the MFP 200. Numeral 1301 designates a metadata, and numeral 1302 designates a vector data. These are the same as the data of the electronic document 1200 of the copy source. Numeral 1305 designates URI with which the electronic document to be stored can be specified via a network, and which is included in the metadata 1301.

<Structure of Data to be Generated on the Occasion when the Duplicated Electronic Document is Normally Printed Using the MFP 200>

Next, the structure of data to be generated on the occasion when the duplicated electronic document is normally printed using the MFP 200 will be described referring to FIG. 6.

Figure 6:
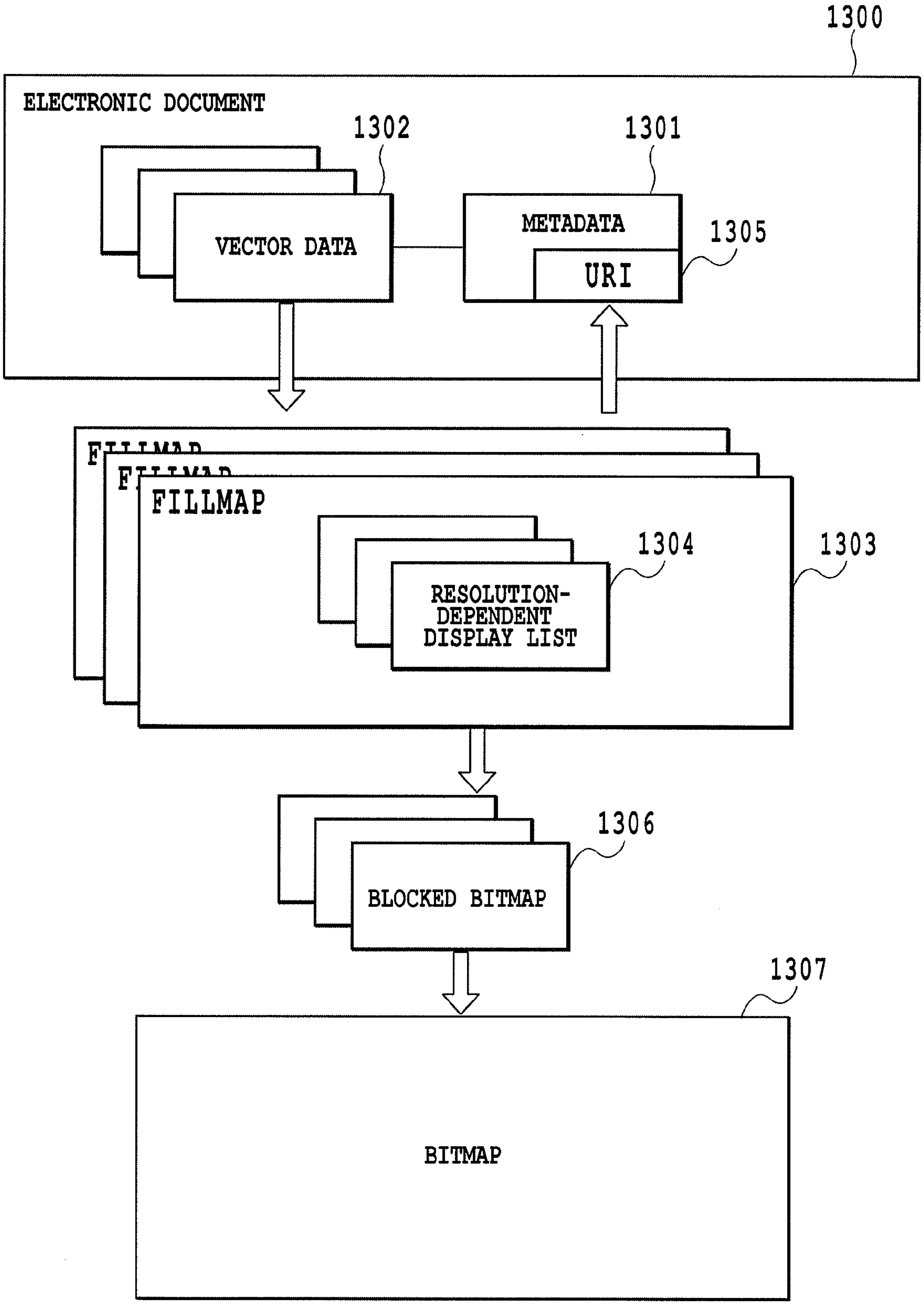
FIG. 6 is a schematic diagram illustrating a structure of data to be generated on the occasion of normal printing using the MFP in the first embodiment according to the present invention.

FIG. 6 is a diagram illustrating the structure of data to be generated on the occasion when the duplicated electronic document is normally printed using the MFP 200.

Numeral 1303 designates a Fill Map that is generated from the vector data 1302, and numeral 1304 designates a resolution-dependent display list that forms this Fill Map 1303. Numeral 1306 designates a blocked bitmap to be generated from the Fill Map 1303, and numeral 1307 designates a bitmap data to be generated from the blocked bitmap 1306 and to be transmitted to a printer.

As just described, on the occasion when the duplicated electronic document is normally printed using the MFP 200, the bitmap 1307 is generated from the duplicated electronic document 1300.

<Structure of Data to be Generated on the Occasion when High-Quality Printing of the Duplicated Electronic Document is Performed using the MFP 200>

Next, the structure of data to be generated on the occasion when high-quality printing of the duplicated electronic document is performed using the MFP 200 will be described referring to FIG. 7.

Figure 7:
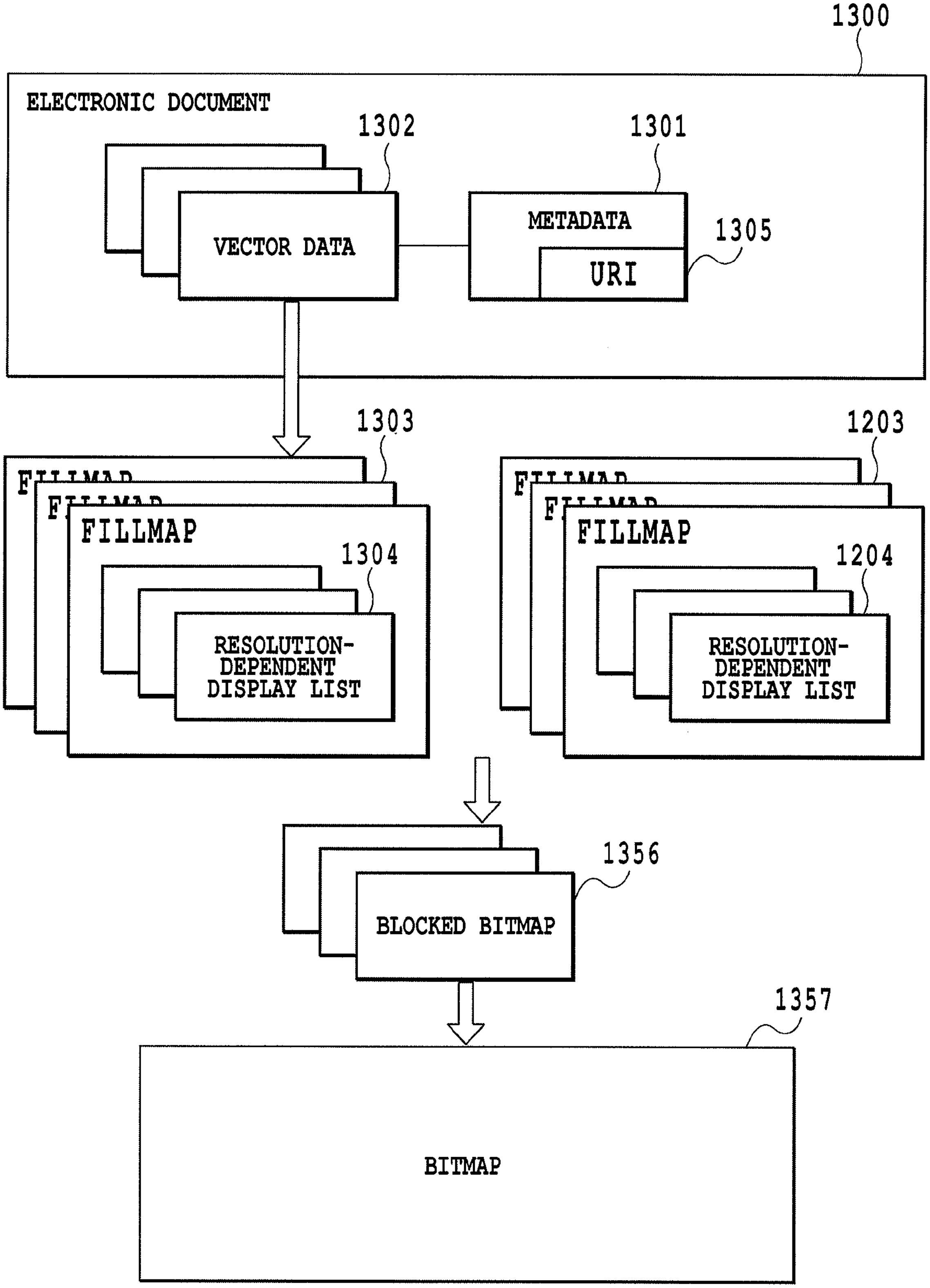
FIG. 7 is a schematic diagram illustrating a structure of data to be generated on the occasion of printing of high quality using the MFP in the first embodiment according to the present invention.

FIG. 7 is a diagram illustrating the structure of data to be generated on the occasion when high-quality printing of the duplicated electronic document is performed using the MFP 200.

The Fill Map 1203 and the resolution-dependent display list 1204 that are illustrated in this drawing are the same as those of the copy source that are stored on the MFP 100 respectively. Numeral 1356 designates a blocked bitmap that is generated from the Fill Map 1303 and the Fill Map 1203, and numeral 1357 designates a bitmap to be generated from the blocked bitmap 1356 and to be transmitted to a printer.

With the arrangement, on the occasion when high-quality printing of the duplicated electronic document is performed using the MFP 200, the bitmap 1357 is generated from the duplicated electronic document 1300.

<Processing in the Case of Scanning a Paper Document and Storing an Electronic Document>

Now, with reference to the schematic diagrams of FIGS. 1 and 2 and FIG. 4, according to a flowchart of FIG. 8, processing of the job control unit 107 in the case of scanning a paper document and storing an electronic document will be described.

Figure 8:
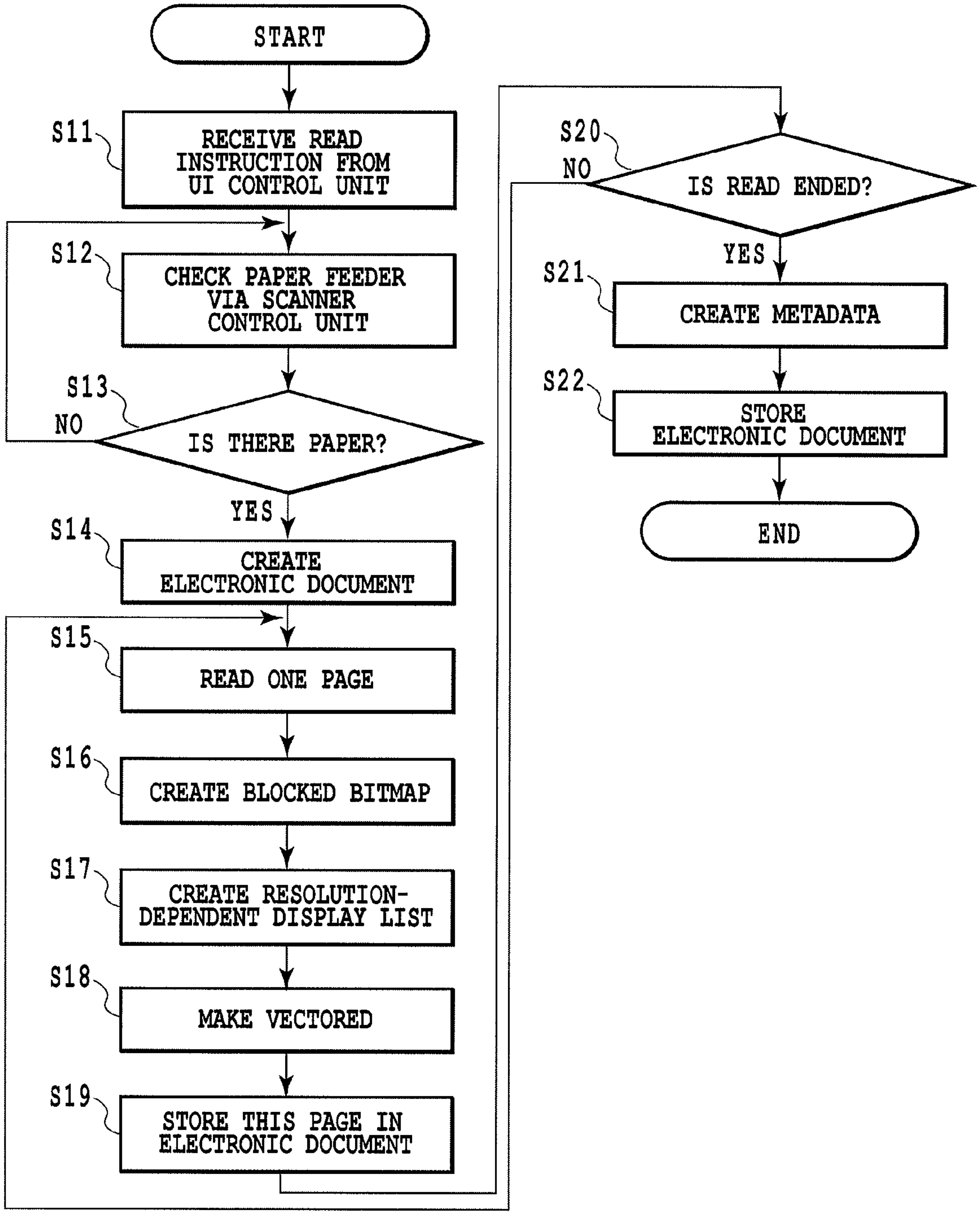
FIG. 8 is a flowchart showing a processing content of scanning a paper document and storing an electronic document using the MFP in the first embodiment according to the present invention.

FIG. 8 is a flowchart of processing of the job control unit 107 of the MFP 100.

The job control unit 107, when having received a read instruction of a paper document via the UI control unit 104 from the user interface 101 (Step S11), makes a check of whether the paper document is set on a paper feeder of a scanner through the scanner control unit 103 (Step S12).

At this time, when there is no paper document on the paper feeder (when it is No in determination of Step S13), the job control unit 107 repeats this check until the paper document is placed. On the other hand, when it is recognized that the paper document is placed on the paper feeder (in the case of Yes in determination of Step S13), the job control unit 107 makes an instruction of creation of a document with respect to the document management unit 109 and creates a new electronic document 1200 (Step S14).

Thereafter, the job control unit 107 reads an image of one page as the bitmap 1207 (Step S15), and makes an image processing using the image processing unit 108. At this time, the job control unit 107 decomposes an image on the bitmap 1207 into units of blocks to create the blocked bitmap 1206, and creates the resolution-dependent display list 1204, being a list of drawing objects (Step S17).

In addition, the job control unit 107 makes each drawing object vectored using the resolution-dependent display list to create the vector data 1202 (Step S18). When the vector data of one page is generated, the job control unit 107 stores these data in the electronic document 1200 (step S19).

Further, the job control unit 107, while a paper document is being placed on the paper feeder, returns to Step S15 (in the case of No in determination of Step S20), and repeats this processing. On the other hand, when all read in has ended (in the case of Yes in determination of Step S20), the job control unit 107 creates the metadata 1201 of the electronic document 1200 (Step S21). Incidentally, the job control unit 107 writes nothing in URI 1205.

Finally, the job control unit 107 stores the electronic document 1200 in the storage 150 via the document management unit 109 (Step S22) and ends the processing.

Incidentally, it is not always necessary to create vectored data to be executed in the above-mentioned Step S18. However, since it is effective in the case of printing in different resolutions in the same MFP or in creation of a thumb nail, it is arranged to create vectored data at the time of scanning. As a matter of course, an arrangement is possible that a vector data is created at the time of duplication of an electronic document. Furthermore, on the occasion of creating a metadata in the above-mentioned Step S21, it is also possible to be in arrangement of always embedding the URI which specify a location storing this electronic document in the metadata.

<Processing in the Case of Duplicating an Electronic Document and Transmitting it to the MFP 200>

Now, with reference to the schematic diagrams of FIGS. 1 and 2 and FIG. 5, according to a flowchart of FIG. 9, processing of the job control unit 107 in the case of duplicating an electronic document and transmitting it to the MFP 200 will be described.

Figure 9:
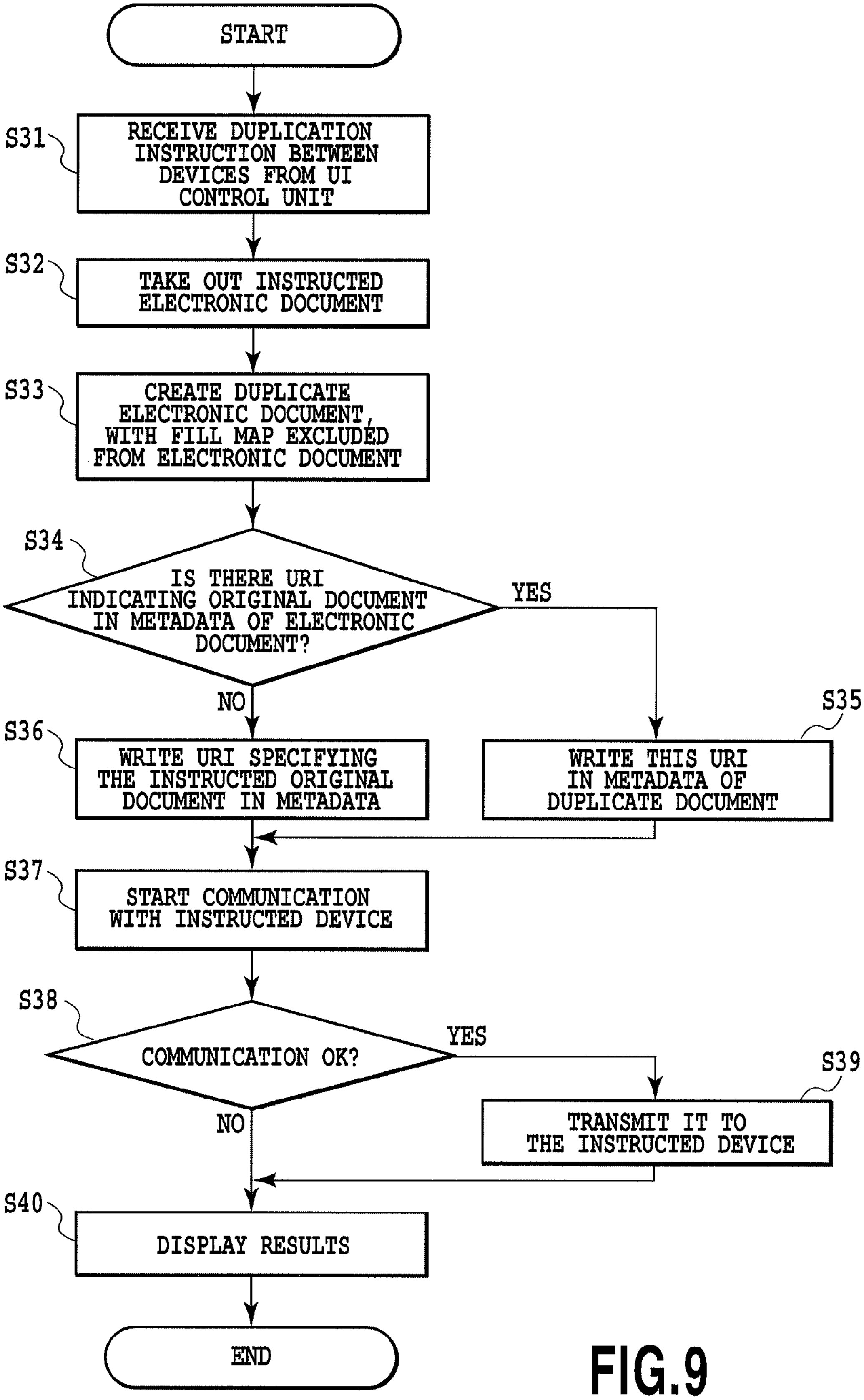
FIG. 9 is a flowchart showing a processing content of duplicating an electronic document and transmitting it to the other MFP using the MFP in the first embodiment according to the present invention.

FIG. 9 is a flowchart of the processing of the job control unit 107 of the MFP 100.

First, the job control unit 107, when having received a duplication instruction of an electronic document between devices via the UI control unit 104 from the user interface 101 (Step S31), makes inquires at the document management unit 109 to take out the corresponding electronic document 1200 (Step S32).

When there is included the Fill Map 1203 in this electronic document, the job control unit 107 creates the duplicate document 1300 excluding Fill Map 1203 as illustrated in FIG. 5 (Step S33).

When there is information of the URI 1205 indicating the location of the original data as the metadata 1201 of the electronic document 1200 (in the case of Yes in determination of Step S34), this electronic document is a duplicate document of the other electronic document. Thus, the job control unit 107 writes the content of this URI 1205 in the URI 1305 on the metadata 1301 of the duplicated electronic document 1300 (Step S35).

When there is written nothing in the URI 1205 (in the case of No in determination of Step S34), this electronic document 1200 is an electronic document that is created at this MFP

100. In this case, the job control unit 107 writes the URI with which this electronic document 1200 to be the original data can be specified on the network in the URI 1305.

When the duplicate document has been created, the job control unit 107 starts communication with the specified device (Step S37).

When the communication has been made correctly (in the case of Yes in determination of Step S38), the job control unit 107 transmits the duplicated electronic document 1300 with respect to the specified device (Step S39). Further, when it is normally ended, the job control unit 107 displays results thereof on the user interface 101 and ends a series of processing. On the other hand, in the case of having failed in this communication (in the case of No in determination of Step S38), the job control unit 107 displays this failure on the user interface 101 and ends a series of processing.

Incidentally, reception processing of the MFP 200 is simply to store an electronic document, so that descriptions thereof will be omitted.

Furthermore, on the occasion of creating a metadata in Step S21 illustrated in the above-described FIG. 8, when the URI of this document is arranged to be embedded in the metadata at all times, the processing in the above-mentioned Steps S34, S35 and S36 is simply to duplicate the URI of the original document.

In addition, in the above-mentioned Step S39, the duplicated electronic document 1300 is directly transmitted to the specified device. As the feature of this processing, an advantage exits in that a printing performance such as resolution of an MFP on the side of using a duplicate document needs not to be known at the time of document duplication. Therefore, it is preferable that the duplicated electronic document 1300 is distributed via a server, or copied using an USB memory.

<Processing in the Case of Normally Printing with Respect to the Duplicated Electronic Document on the MFP 200>

Now, with reference to the schematic diagrams of FIGS. 1 and 2 and FIG. 6, according to a flowchart of FIG. 10, processing of the job control unit 107 in the case of normal printing (a first printing of low quality) with respect to a duplicated electronic document on the MFP 200 will be described.

Figure 10:
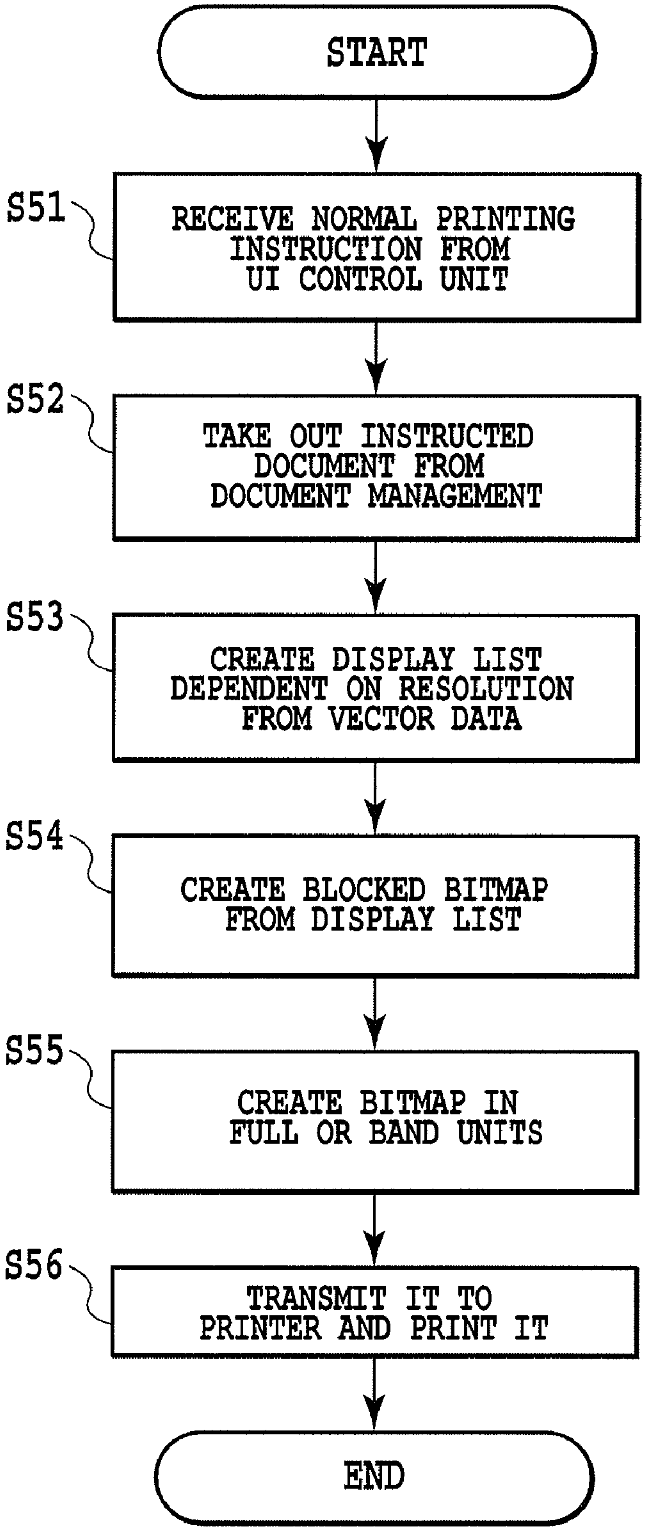
FIG. 10 is a flowchart showing a processing content of printing a duplicate document of normal quality using the MFP in the first embodiment according to the present invention.

FIG. 10 is the flowchart of the processing of the job control unit 107 of the MFP 200.

First, the job control unit 107, having received a normal printing instruction of an electronic document via the UI control unit 104 from the user interface 101 (Step S51), makes inquiries at the document management unit 109 and takes out the corresponding electronic document 1300 (Step S52).

Next, the job control unit 107 generates the resolution-dependent display list 1304 from the vector data 1302 of this electronic document using the image processing unit 108 (Step S53). The resolution at this time is determined by the above-mentioned printing instruction and the printing performance of this device.

Subsequently, the job control unit 107 creates the blocked bitmap 1306 from the resolution-dependent display list 1304 having been generated (Step S54). Further, the job control unit 107 creates the bitmap 1307 in full or band units by the printing mechanism of the MFP 200 (Step S55).

Thereafter, the job control unit 107 transmits the bitmap 1307 to a printer (not illustrated) provided at this MFP 200 via the printer control unit 105, and causes this printer to perform printing (Step S56).

<Processing in the Case of High-Quality Printing of the Duplicated Electronic Document on the MFP 200>

Now, with reference to the schematic diagrams of FIGS. 1 and 2 and FIG. 7, according to a flowchart of FIG. 11, processing of the job control unit 107 in the case of high-quality printing of the duplicated electronic document (in the case of a second printing of higher quality than the first printing) on the MFP 200 will be described.

Figure 11:
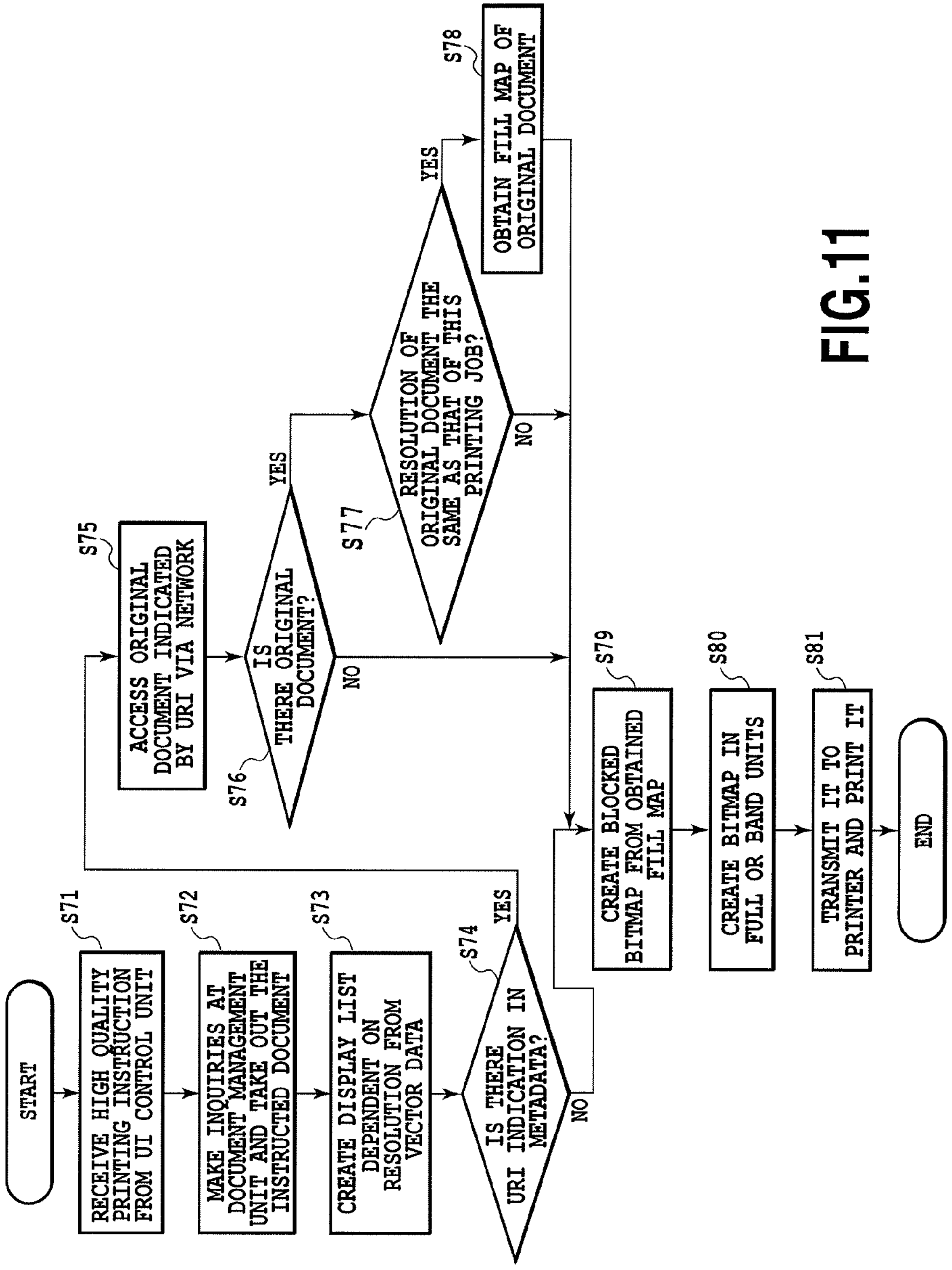
FIG. 11 is a flowchart showing a processing content of printing a duplicate document of normal quality using the MFP in the first embodiment according to the present invention.

FIG. 11 is the flowchart of the processing of the job control unit 107 of the MFP 200.

First, the job control unit 107, when having received an instruction of high quality printing of an electronic document via the UI control unit 104 from the user interface 101 (Step S71), makes inquiries at the document management unit 109 and takes out the corresponding electronic document 1300 (Step S72).

Subsequently, the job control unit 107, generates the resolution-dependent display list 1304 from the vector data 1302 of this electronic document 1300 using the image processing unit 108 (Step S73). The resolution at this time is determined by the above-mentioned printing instruction and the printing performance of this device.

Further, when the URI of the original document, being the copy source is specified in the URI 1305 on the metadata (in the case of Yes in determination of Step S74), the job control unit 107 accesses the original document having been specified via the network 1 (Step S75).

At this time, when there is present the original document (in the case of Yes in determination of Step S76), the job control unit 107 further determines whether or not the resolution of this document is the same as that determined in this printing job (Step S88).

When the resolution of the original document is the same as that determined in this printing job, the job control unit 107 obtains via the network the Fill Map 1203 of the original document 1200 (Step S78). Here, the original document the URI indicates, when a document is a duplicate over some generations, is specified to be the oldest (original) document.

Next, the processing goes to Step S79. Also in the case of No in determination of each of the above-mentioned Steps S74, S76 and S77, the processing goes to Step S79.

The job control unit 107 creates the blocked bitmap 1356 based on the obtained Fill Map 1203 (Step S79), and further creates the bitmap 1357 in full or band units (Step S80).

Thereafter, the job control unit 107 transmits the bitmap 1357 to a printer (not illustrated) provided at this MFP 200 via the printer control unit 105, and causes this printer to print it (Step S81). Under this condition, the Fill Map 1203 that is obtained from the original document is expected to be of higher quality than the Fill Map 1303 that is obtained by having once created the vectored bitmap and then creating the bitmap again, so that a user can obtain high-quality printing results.

In the case of No in Steps S74, S75 and S77, the obtained Fill Map is the Fill Map 1303 that is obtained by having once created the vectored bitmap and then creating the bitmap again, so that high-quality printing results cannot be obtained. However, it is quite the same as printing results described referring to FIG. 10, so that although it is not of high quality, at least normal printing results can be obtained.

Although descriptions are not made particularly in the drawings, when the duplicate document is edited on the MFP, this document comes to be an original document, and the content of the URI of the metadata is cleared in order to be irrelevant to the copy source.

Incidentally, although in the above-mentioned Step S77, the resolution of the original document that is indicated with the URI and the resolution of this printing job are compared, when resolution information of the original document is embedded in the metadata, it is preferable to make a comparison before inquiries via a network.

Furthermore, even if these resolutions are not quite the same, it is preferable to be in arrangement of obtaining the Fill Map in case where the resolution of the original document is an integral multiple of the resolution that is required in the printing job.

In addition, in the above-mentioned Step S79, when both the Fill Map having been created from the vector data and the Fill Map of the original document are obtained, as to with which Fill Map the blocked bitmap is created, here there is no particular description. In this case, several methods can be thought as follows.

(1) The Fill Map of the original document is used at all the time.

(2) In drawing that is supposed to be of the same quality, for example, a simple rectangle, the Fill Map of the vector data is used, and the Fill Map of the corresponding original document is not obtained.

(3) The one that is thought to be of high quality from a direct comparison is selected.

Furthermore, although in the above-mentioned Step S78, the Fill Map of the original document is obtained at all times, when a number of high-quality printing is known or supposed to be performed from the duplicate document, it is preferable to store the Fill Map having been transferred as it is. Alternatively, when there is enough room in the storage of the MFP of copy destination, it is preferable to be arranged so that the Fill Map having been used once is always stored, and only when the storage becomes cluttered with files, it is deleted.

Other Embodiments

Incidentally, an object of the present invention is also achieved by readout and execution of a program code that performs the procedure of the flowcharts described in the above-described embodiments using a computer (or CPU or MPU) of a system or a device from a recording medium in which this program code is recorded. In this case, the program code itself having been read out from the recording medium is to cause the computer to implement the functions of the above-described embodiments. Therefore, these program code and computer readable recording medium in which the program code is stored/recorded also form one of the present invention.

As such recording medium for providing the program code, employed can be, for example, a floppy (trademark) disk, a hard disk, an optical disk, a magnetic optical disk, CD-ROM, CD-R, a magnetic tape, a non-volatile memory card and ROM.

CONCLUSION

As is seen from the above descriptions, on the occasion of duplicating an electronic document on a plurality of MFPs, the electronic document of small size can be transferred. Further, at the time of printing a duplicate document, by transferring necessary Fill Map only when high quality is desired, required results are found to be obtainable without applying a high load to a network.

In addition, even when the scan resolution of the original document and the printer resolution of the duplicate document are different, and high-quality printing cannot be performed, or even when the network is disconnected, and thus a user cannot access the other MFP or server, printing results at normal level can be obtained.

Furthermore, even if the resolution of the original document and the printer resolution of the duplicate document are different, in some cases, the printer resolution of the MFP that has duplicated this duplicate document again and stored it, and the resolution of the original document are coincident. At this time, the document having been duplicated again obtains the same Fill Map as that of the original document, so that printing of high quality can be performed. Incidentally, although devices of creating an electronic document are required to have scanner functions to be a network scanner or MFP, it is preferable that a printing device is not MFP, but a single-function printer (SFP).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-132323, filed May 20, 2008, which is hereby incorporated by reference herein in its entirety.

What is claimed is:

1. An image forming device comprising:

a unit for receiving a duplicate electronic document including vector data and metadata generated in another image forming device, wherein the vector data is generated from a first resolution-dependent display list which is not included in the duplicate electronic document;

a unit for, in the case of a first printing, generating a second resolution-dependent display list from the vector data of the duplicated electronic document;

a unit for, in the case that a second printing which is higher quality than that of the first printing is performed, and a resolution of an original electronic document which is a copy source of the duplicate electronic document and a resolution in the second printing are in the same range as a result of comparing the resolutions, obtaining the first resolution-dependent display list having been used in creation of the vector data from information included in the metadata, wherein the information indicates the location of the original electronic document which is the copy source of the duplicate electronic document; and a unit for printing by using the second resolution-dependent display list generated from the vector data, or using the first resolution-dependent display list obtained from the information which indicates the location of the original electronic document.

2. The image forming device according to claim 1, wherein the original electronic document being a copy source of the duplicate electronic document includes at least a resolution-dependent display list, vector data generated by vectoring drawing data included in the original electronic document, and metadata, and wherein the copy source is stored in an image forming device connected via a network.

3. The image forming device according to claim 1, wherein the resolution to be compared is determined at the time of a printing instruction of the duplicate electronic document.

4. An image forming method performed in an image forming device, comprising:

receiving a duplicate electronic document including vector data and metadata generated in another image forming device, wherein the vector data is generated from a first resolution-dependent display list which is not included in the duplicate electronic document;

in the case of a first printing, generating a second resolution-dependent display list from the vector data of the duplicated electronic document;

in the case that a second printing is performed which is higher quality than that of the first printing, and a resolution of an original electronic document which is a copy source of the duplicate electronic document and a resolution in the second printing are in the same range as a result of comparing the resolutions, obtaining the first resolution-dependent display list having been used in creation of the vector data from information included in the metadata, wherein the information indicates the location of the original electronic document which is the copy source of the duplicate electronic document; and printing by using the second resolution-dependent display list generated from the vector data, or using the first resolution-dependent display list obtained from the information which indicates the location of the original electronic document.

5. The image forming method according to claim 4, wherein the original electronic document being a copy source of the duplicate electronic document includes at least a resolution-dependent display list, vector data generated by vectoring drawing data included in the original electronic document, and metadata, and wherein the copy source is stored in an image forming device connected via a network.

6. The image forming method according to claim 4, wherein the resolution to be compared is determined at the time of a printing instruction of the duplicate electronic document.

7. A non-transitory computer readable recording medium storing a program for executing a method comprising:

receiving a duplicate electronic document including vector data and metadata generated in another image forming device, wherein the vector data is generated from a first resolution-dependent display list which is not included in the duplicate electronic document;

in the case of a first printing, generating a second resolution-dependent display list from the vector data of the duplicated electronic document;

in the case that a second printing is performed which is higher quality than that of the first printing, and a resolution of an original electronic document which is a copy source of the duplicate electronic document and a resolution in the second printing are in the same range as a result of comparing the resolutions, obtaining the first resolution-dependent display list having been used in creation of the vector data from information included in the metadata, wherein the information indicates the location of the original electronic document which is a copy source of the duplicate electronic document; and printing by using the second resolution-dependent display list generated from the vector data, or using the first resolution-dependent display list obtained from the information which indicates the location of the original electronic document.

* * * * *